(12) United States Patent
Owada

(10) Patent No.: US 12,632,278 B2
(45) Date of Patent: May 19, 2026

(54) PROCESSING UNIT AND PROCESSING SYSTEM

(71) Applicant: SoftBank Corp., Tokyo (JP)

(72) Inventor: Minoru Owada, Saitama (JP)

(73) Assignee: SoftBank Corp., Tokyo (JP)

( * ) Notice: Subject to any disclaimer, the term of this patent is extended or adjusted under 35 U.S.C. 154(b) by 753 days.

(21) Appl. No.: 17/864,447

(22) Filed: Jul. 14, 2022

(65) Prior Publication Data

US 2022/0350636 A1      Nov. 3, 2022

Related U.S. Application Data

(63) Continuation of application No. PCT/JP2020/045143, filed on Dec. 3, 2020.

(30) Foreign Application Priority Data

Jan. 22, 2020      (JP) ................................. 2020-008527

(51) Int. Cl.
  *G06F 9/455*         (2018.01)
  *G06F 9/345*         (2018.01)
(52) U.S. Cl.
  CPC .......... G06F 9/45558 (2013.01); G06F 9/345 (2013.01); *G06F 2009/4557* (2013.01); *G06F 2009/45583* (2013.01)
(58) Field of Classification Search
  CPC ................. G06F 9/45558; G06F 9/345; G06F 2009/4557; G06F 2009/45583; G06F 9/50
  See application file for complete search history.

(56) References Cited

U.S. PATENT DOCUMENTS 9,268,614 B2 *   2/2016   Barsness ............... G06F 9/5066
11,275,631 B1 *   3/2022   Shlychkov .............. G06F 9/544
(Continued)

FOREIGN PATENT DOCUMENTS

JP        2006190281 A      7/2006
JP        2019220003 A      12/2019
(Continued)

OTHER PUBLICATIONS

International Search Report and (ISA/237) Written Opinion of the International Search Authority for International Patent Application No. PCT/JP2020/045143, mailed by the Japan Patent Office on Mar. 2, 2021.
(Continued)

*Primary Examiner* — Lewis A Bullock, Jr.
*Assistant Examiner* — Kevin X Lu

(57) ABSTRACT

Provided is a processing unit including a parallel processing determination unit configured to determine whether parallel processing is to be performed on at least some of processing target data, a VM execution control unit configured to cause each of a plurality of cores included in a parallel processing execution unit to execute a VM when the parallel processing determination unit determines that the parallel processing is to be performed, a storage control unit configured to divide at least some of the processing target data into partial data that can be processed in parallel and to cause a memory of the parallel processing execution unit to store the partial data, and a processing result obtaining unit configured to obtain a plurality of processing results of the partial data processed by VMs of the plurality of cores from the parallel processing execution unit.

15 Claims, 6 Drawing Sheets

(56)                  References Cited

U.S. PATENT DOCUMENTS

| | | | | |
|---|---|---|---|---|
| 11,307,898 B2* | 4/2022 | Gauthier | ............... | G06F 9/5038 |
| 2006/0146057 A1 | 7/2006 | Blythe | | |
| 2007/0294681 A1* | 12/2007 | Tuck | .................. | G06F 11/3404 |
| | | | | 717/149 |
| 2011/0157195 A1* | 6/2011 | Sprangle | ............... | G06F 9/3877 |
| | | | | 345/522 |
| 2013/0159397 A1 | 6/2013 | Yamashita | | |
| 2014/0278496 A1* | 9/2014 | Spencer | ................. | G16H 40/20 |
| | | | | 705/2 |
| 2016/0178801 A1* | 6/2016 | Bobrek | .................. | G01V 1/303 |
| | | | | 703/2 |
| 2016/0253219 A1* | 9/2016 | Chen | ......................... | G06F 9/52 |
| | | | | 718/106 |
| 2017/0161204 A1* | 6/2017 | Roberts | ..................... | G06T 1/60 |
| 2017/0255491 A1* | 9/2017 | Bradshaw | ............. | G06F 9/5061 |
| 2017/0347236 A1* | 11/2017 | Frusina | ................. | H04L 47/125 |
| 2018/0300132 A1* | 10/2018 | Daloze | .................. | G06F 9/3885 |
| 2019/0347125 A1* | 11/2019 | Sankaran | .............. | G06F 9/3842 |
| 2020/0348958 A1* | 11/2020 | Krasner | .............. | G06F 9/45558 |
| 2020/0356839 A1* | 11/2020 | Tocornal | ................ | G06N 3/044 |
| 2020/0410628 A1* | 12/2020 | Shah | ......................... | G06T 1/20 |
| 2021/0089363 A1* | 3/2021 | Bergsma | .............. | G06F 9/4881 |
| 2021/0132807 A1* | 5/2021 | Crow | ..................... | G06F 3/0683 |
| 2021/0173714 A1* | 6/2021 | Huang | ................. | G06F 16/148 |
| 2021/0192287 A1* | 6/2021 | Dwivedi | .............. | G06F 9/3877 |
| 2021/0240457 A1 | 8/2021 | Yamato | | |
| 2021/0294662 A1* | 9/2021 | Goyal | ................. | G06F 16/9014 |
| 2021/0405981 A1* | 12/2021 | Yamato | .................. | G06F 8/445 |

FOREIGN PATENT DOCUMENTS

| | | | |
|---|---|---|---|
| WO | 2012023175 A1 | 2/2012 |
| WO | 2019005485 A1 | 1/2019 |
| WO | 2019216127 A1 | 11/2019 |

OTHER PUBLICATIONS

Office Action issued for counterpart Japanese Application No. 2020-008527, issued by the Japanese Patent Office on Apr. 19, 2022 (drafted on Apr. 11, 2022).

* cited by examiner

<u>200</u>

1200

PROCESSING UNIT AND PROCESSING SYSTEM

The contents of the following Japanese patent application (s) are incorporated herein by reference:

NO. 2020-008527 filed in JP on Jan. 22, 2020
NO. PCT/JP2020/045143 filed in WO on Dec. 3, 2020

BACKGROUND

1. Technical Field

The present invention relates to a processing unit and a processing system.

2. Related Art

A general purpose graphics processing unit (general purpose GPU: GPGPU) has been proposed in which an arithmetic resource of a GPU is applied for a purpose other than image processing (for example, see Patent document 1).

LIST OF CITED REFERENCES

Patent Literatures

Patent literature 1: Japanese Patent Application Publication No. 2019-220003

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
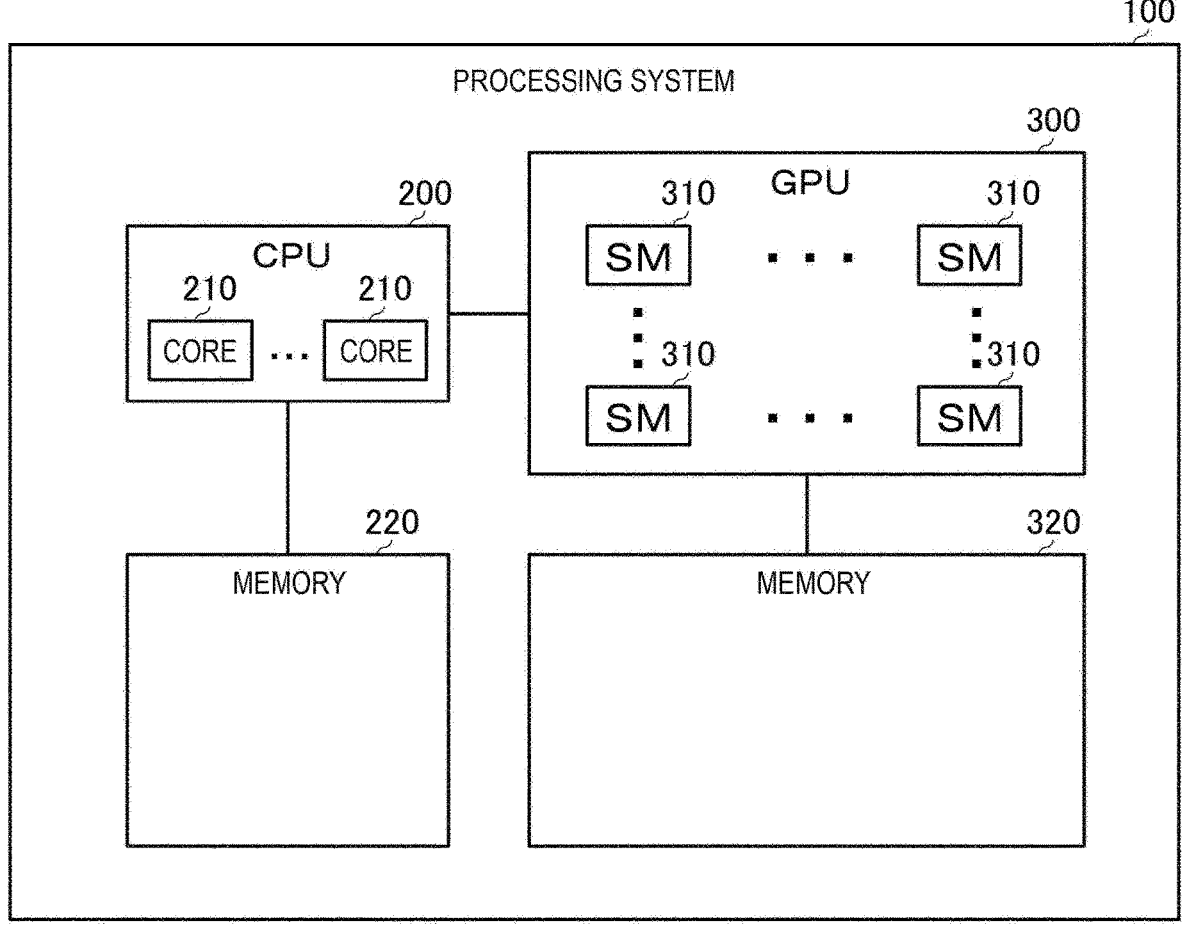
FIG. 1 schematically illustrates one example of a processing system 100.

FIG. 1 schematically illustrates one example of a processing system 100. The processing system 100 has a CPU 200 and a GPU 300. The CPU 200 may be one example of a processing unit. The GPU 300 may be one example of a parallel processing execution unit.

The CPU 200 has a plurality of cores 210. In addition, the CPU 200 has a memory 220.

The GPU 300 has a plurality of streaming multiprocessors (SMs) 310. The SM may be one example of a core of the GPU 300. In addition, the GPU 300 has a memory 320.

The CPU 200 according to the present embodiment is configured to determine whether parallel processing is to be performed on at least some of processing target data, and when it is determined that the parallel processing is to be performed, cause the GPU 300 to execute the parallel processing on at least some of the processing target data.

Figure 2:
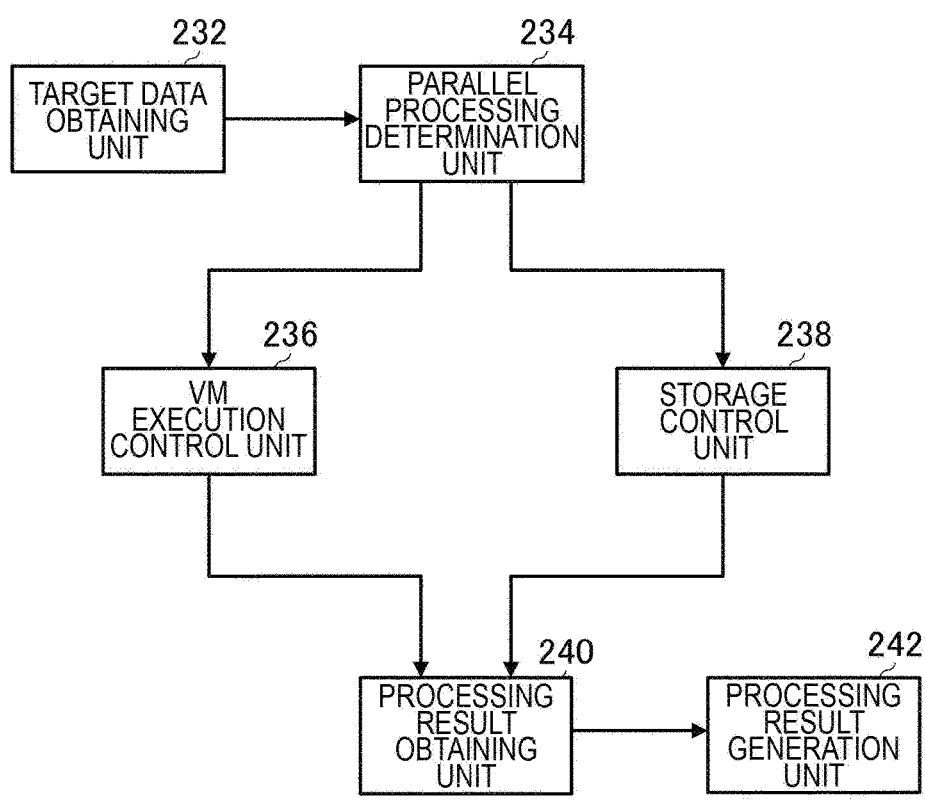
FIG. 2 schematically illustrates one example of a functional configuration of a CPU 200.

FIG. 2 schematically illustrates one example of a functional configuration of the CPU 200. The CPU 200 includes a target data obtaining unit 232, a parallel processing determination unit 234, a VM execution control unit 236, a storage control unit 238, a processing result obtaining unit 240, and a processing result generation unit 242.

The target data obtaining unit 232 is configured to obtain processing target data. The target data obtaining unit 232 may obtain any data as the processing target data.

The target data obtaining unit 232 may obtain a large volume of data having a certain format as the processing target data. For example, in a case where the processing system 100 is arranged in an Internet of Thing (IoT) system, the target data obtaining unit 232 obtains, as the processing target data, a message queueing telemetry transport (MQTT) message or the like received by the processing system 100. The target data obtaining unit 232 may be one example of a message obtaining unit. The target data obtaining unit 232 may obtain the processing target data from the MQTT message or the like.

The parallel processing determination unit 234 is configured to determine whether at least some of processing target data obtained by the target data obtaining unit 232 is to be processed in parallel. For example, when the processing target data includes data that can be processed in parallel with at least some of processing target data, the parallel processing determination unit 234 determines that at least some of the processing target data is to be processed in parallel.

The parallel processing determination unit 234 may analyze the processing target data to determine whether at least some of the processing target data can be processed in parallel. For example, when parallel processing of a plurality of pieces of data in the processing target data can be executed without being associated with mutual processes, the parallel processing determination unit 234 determines that the parallel processing can be performed.

The parallel processing determination unit 234 may determine that the CPU 200 is to process a first part of the processing target data, and the GPU 300 is caused to perform parallel processing on a second part of the processing target data. The parallel processing determination unit 234 determines, for example, that the first part that cannot be processed in parallel among the processing target data is to be processed in the CPU 200, and the second part that can be processed in parallel is caused to be processed in parallel in the GPU 300.

When the parallel processing determination unit 234 determines that the parallel processing is to be performed, the VM execution control unit 236 is configured to cause each of the plurality of SMs 310 of the GPU 300 to execute a virtual machine (VM). When the parallel processing determination unit 234 determines that the parallel processing is to be performed, the VM execution control unit 236 may execute the VM at the core 210 of the CPU 200 and cause each of the plurality of SMs 310 to execute the VM.

When the parallel processing determination unit 234 determines that the parallel processing is to be performed, the VM execution control unit 236 may execute the VM at the core 210 and cause each of the plurality of SMs 310 to execute a VM having an architecture common to the VM of the core 210. The VM having the architecture common to the VM of the core 210 may be a VM that can output a same processing result as that of the VM of the core 210 in response to a same instruction. Even when physical structures of the CPU 200 and the GPU 300 are entirely different from each other, the processing can be performed in a collaborative manner by causing the SM 310 of the GPU 300 to execute the VM having the architecture common to the VM of the core 210.

When the parallel processing determination unit 234 determines that the first part of the processing target data is to be processed in the CPU 200, and the GPU 300 is caused to perform the parallel processing on the second part of the processing target data, the VM execution control unit 236 may cause the VM of the core 210 to process the first part.

The storage control unit 238 is configured to divide at least some of the processing target data caused to be processed in parallel by the GPU 300 into partial data that can be processed in parallel, and to cause the memory 320 of the GPU 300 to store the partial data. When the parallel processing determination unit 234 determines that the GPU 300 is caused to perform the parallel processing of the second part of the processing target data, the storage control unit 238 may divide the second part that can be processed in parallel into partial data, and cause the memory 320 to store the partial data.

The processing result obtaining unit 240 is configured to obtain processing results of a plurality of pieces of partial data processed by the VMs of the plurality of SMs 310 from the GPU 300. The processing result obtaining unit 240 may obtain the processing result of the first part of the processing target data from the VM of the core 210. The processing result obtaining unit 240 may obtain the processing results of the second part of the processing target data from the GPU 300.

The processing result generation unit 242 is configured to generate a processing result of the processing target data based on the processing result obtained by the processing result obtaining unit 240. The processing result generation unit 242 may generate the processing result of the processing target data by combining the processing result of the first part of the processing target data by the VM of the core 210 with the processing results of the second part of the processing target data by the VMs of the plurality of SMs 310.

Figure 3:
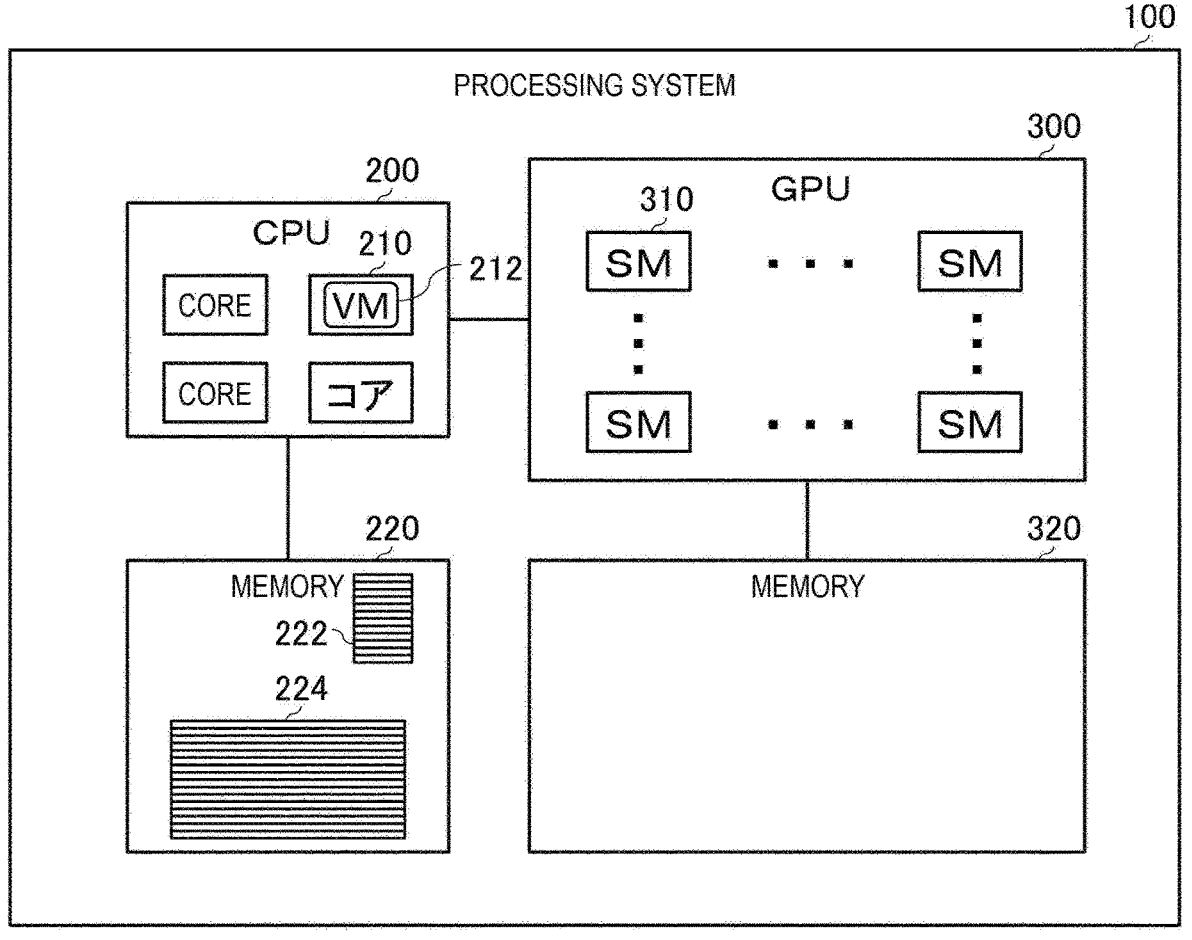
FIG. 3 is an explanatory diagram for describing processing by the CPU 200.
Figure 4:
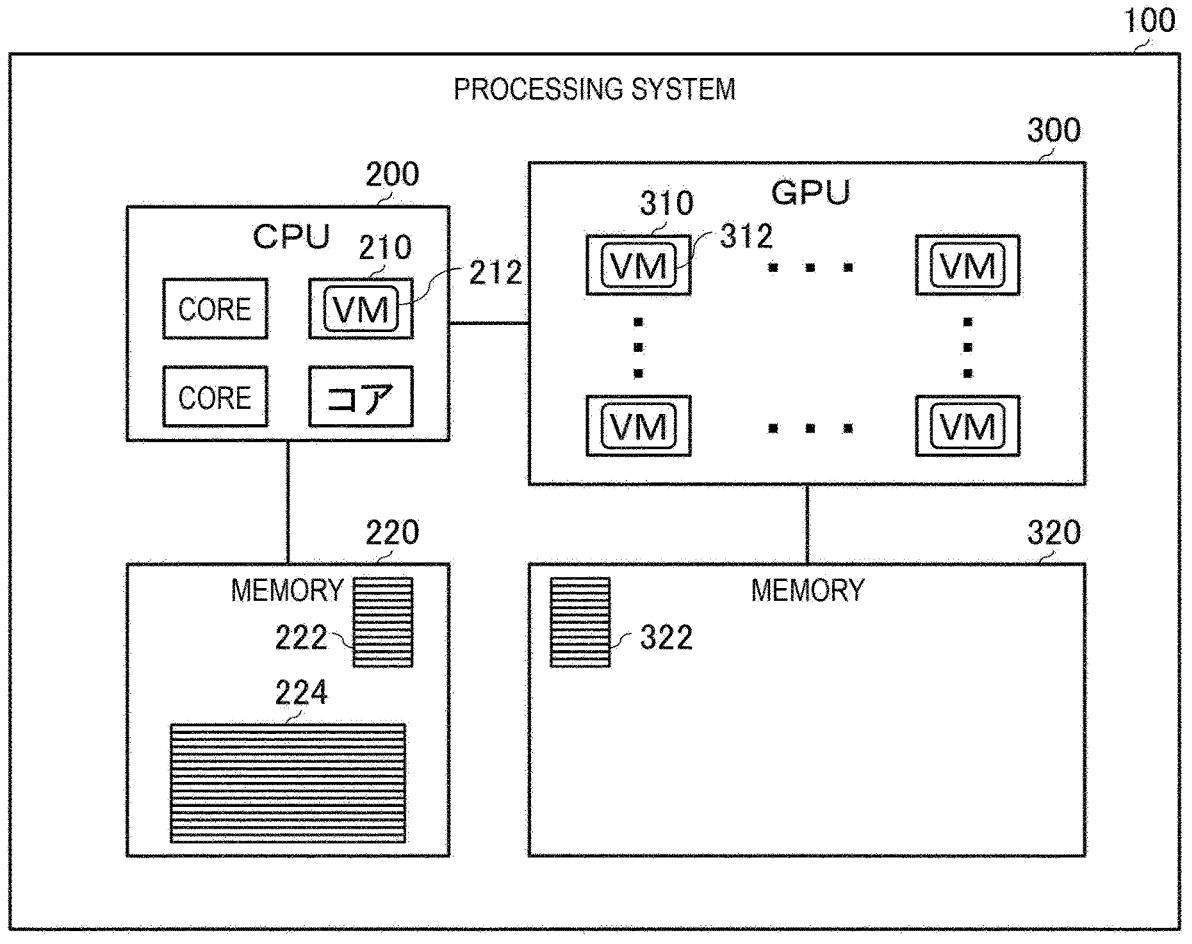
FIG. 4 is an explanatory diagram for describing the processing by the CPU 200.
Figure 5:
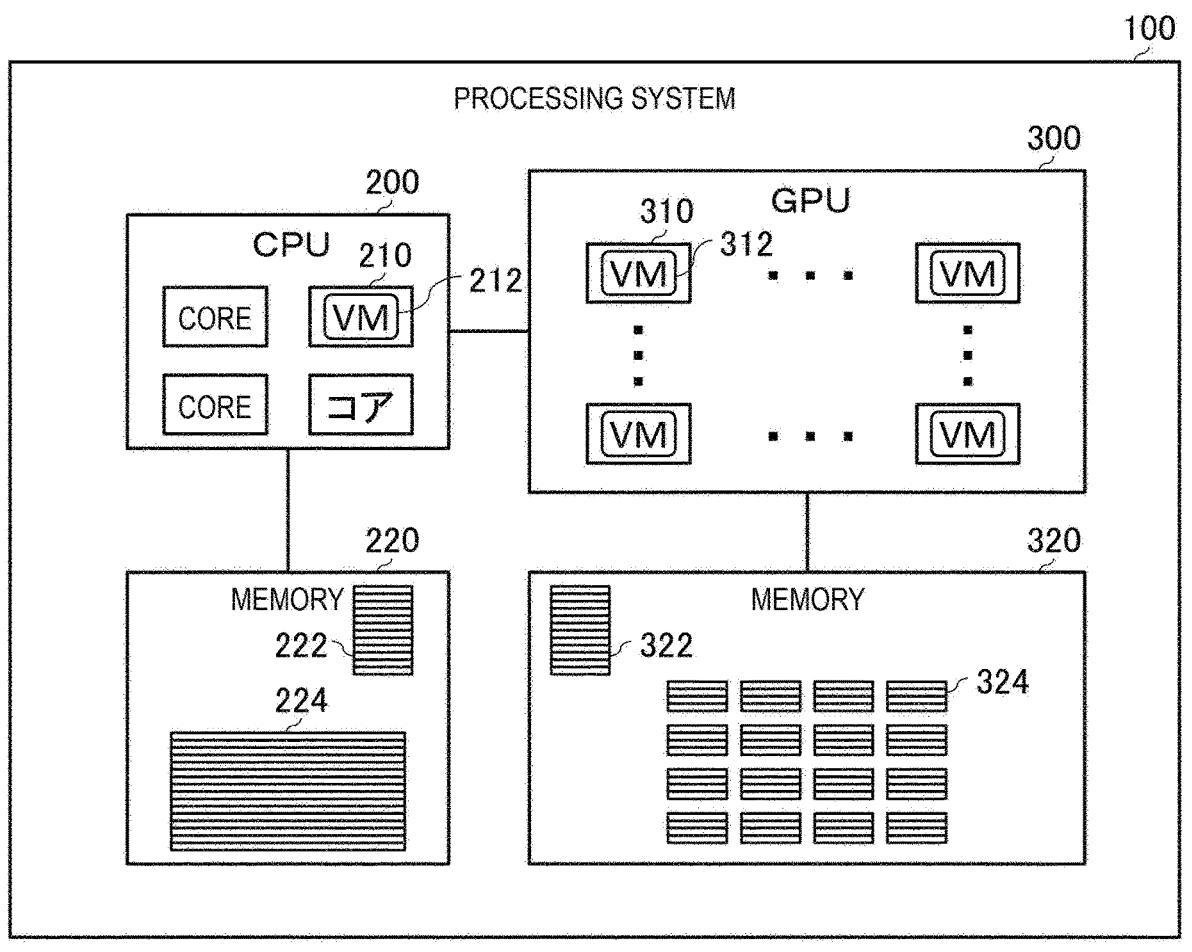
FIG. 5 is an explanatory diagram for describing the processing by the CPU 200.

FIG. 3 to FIG. 5 are explanatory diagrams for describing processing by the CPU 200. As illustrated in FIG. 3, the CPU 200 is configured to execute a VM 212 by at least one of the plurality of cores 210, and refer to an instruction set 222 stored in the memory 220.

In a case where the instruction set 222 includes an instruction for performing parallel processing of the processing target data 224 stored in the memory 220, as illustrated in FIG. 4, the VM 212 is configured to cause each of the plurality of SMs 310 of the GPU 300 to execute a VM 312 having an architecture common to the VM 212. The CPU 200 or the VM 212 causes the memory 320 to store an instruction set 322 obtained by copying the instruction set 222, and indicates an instruction group set as a target and a start location in the instruction set 322 to the VM 312.

As illustrated in FIG. 5, the CPU 200 or the VM 212 divides the processing target data 224 into partial data 324 that can be processed in parallel and causes the memory 320 to store the partial data 324. At this time, a compiler works with the VM 212 and the VM 312 in a coordinated manner such that both the GPU 300 side and the CPU 200 side are to appear as a same variable.

The CPU 200 or the VM 212 may cause pieces of the partial data 324 respectively executed by the plurality of SMs 310 to be stored in locations respectively corresponding to the plurality of SMs 310 in the memory 320. With this configuration, each of the plurality of SMs 310 can appear to have its own dedicated data from the beginning.

The GPU 300 is configured to execute an instruction sequence of the instruction set 322 from a previously indicated location. The parallel processing by the plurality of SMs 310 is started. After the processing of the partial data 324 by the plurality of VMs 312 is completed, the CPU 200 collects the processing results from the partial data 324. The processing results are stored in the memory 220. The processing results are in a state where it is not distinguishable as to whether the processing has been performed by the CPU 200 or the processing has been performed by the GPU 300.

In order to use a so called GPGPU, it is necessary to cautiously use a very complicated API, and there is only a limited number of technical experts who can use the API. In contrast, in accordance with the processing system 100 according to the present embodiment, the CPU 200 determines whether the parallel processing can be executed, and executes the division of the processing target data into the partial data that can be processed in parallel and the storage of the partial data in the memory 320 to obtain the parallel processing results by the plurality of SMs 310. That is, in accordance with the processing system 100, it is possible to cover and hide the conventional API, and a level demanded for the technical experts can be decreased. With this configuration, a use range of the GPGPU can be easily expanded.

Figure 6:
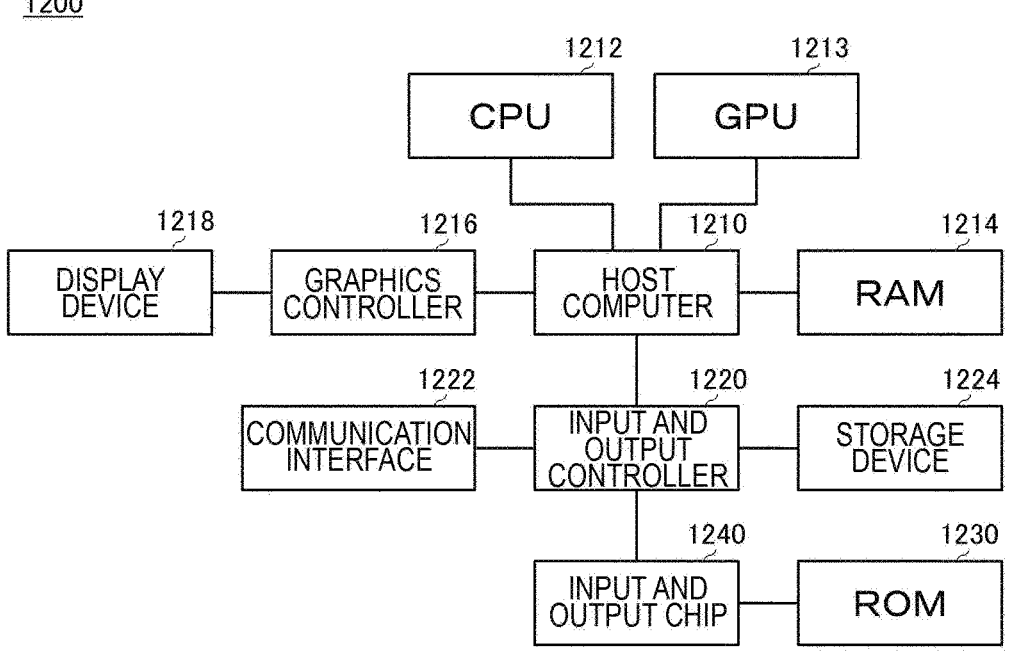
FIG. 6 schematically illustrates one example of a hardware configuration of a computer 1200 configured to function as the processing system 100.

FIG. 6 schematically illustrates one example of a hardware configuration of a computer 1200 configured to function as the processing system 100. A program that is installed in the computer 1200 can cause the computer 1200 to function as one or more units in an apparatus according to the present embodiment, or cause the computer 1200 to execute operations associated with the apparatus according to the present embodiment or the one or more units thereof, and/or cause the computer 1200 to execute processes according to the present embodiment or steps thereof. Such program may be executed by a CPU 1212 so as to cause the computer 1200 to execute certain operations associated with some or all of blocks of flowcharts and block diagrams described herein.

The computer 1200 in accordance with the present embodiment includes the CPU 1212, a GPU 1213, a RAM 1214, and a graphics controller 1216, which are mutually connected by a host controller 1210. The GPU 1213 may be connected to the graphics controller 1216. The computer 1200 also includes input and output units such as a communication interface 1222, a storage device 1224, a DVD drive, and an IC card drive, which are connected to the host controller 1210 via an input and output controller 1220. The DVD drive may be a DVD-ROM drive, a DVD-RAM drive, and the like. The storage device 1224 may be a hard disk drive, a solid-state drive, and the like. The computer 1200 includes legacy input and output units such as a ROM 1230 and a keyboard, which are connected to the input and output controller 1220 via an input and output chip 1240.

The CPU 1212 is configured to operate according to programs stored in the ROM 1230 and the RAM 1214, thereby controlling each unit. The graphics controller 1216 is configured to acquire image data generated by the CPU 1212 on a frame buffer or the like provided in the RAM 1214 or in itself, and to cause the image data to be displayed on a display device 1218.

The communication interface 1222 is configured to communicate with other electronic devices via a network. The storage device 1224 is configured to store programs and data used by the CPU 1212 within the computer 1200. The DVD drive is configured to read the programs or the data from the DVD-ROM or the like, and to provide the storage device 1224 with the programs or the data. The IC card drive is configured to read programs and data from an IC card, and/or to write programs and data into the IC card.

The ROM 1230 is configured to store therein a boot program or the like that is executed by the computer 1200 at the time of activation, and/or a program depending on the hardware of the computer 1200. The input and output chip 1240 may also be configured to connect various input and output units to the input and output controller 1220 via a USB port, a parallel port, a serial port, a keyboard port, a mouse port, and the like.

A program is provided by a computer readable storage medium such as a DVD-ROM or an IC card. The program is read from the computer readable storage medium, is installed into the storage device 1224, the RAM 1214, or the ROM 1230, which are also examples of the computer readable storage medium, and is executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may be configured to cause all or a necessary portion of a file or a database, which has been stored in an external recording medium such as the storage device 1224, the DVD drive (DVD-ROM), the IC card or the like, to be read into the RAM 1214, thereby executing various types of processing on the data on the RAM 1214. The CPU 1212 may be configured to then write back the processed data to the external recording medium.

Various types of information, such as various types of programs, data, tables, and databases, may be stored in the recording medium to undergo information processing. The CPU 1212 may also be configured to execute various types of processing on the data read from the RAM 1214, which includes various types of operations, processing of information, condition judging, conditional branching, unconditional branching, search/replacement of information and the like described throughout the present disclosure and designated by an instruction sequence of programs, and to write the result back to the RAM 1214. The CPU 1212 may also be configured to search for information in a file, a database, etc., in the recording medium. For example, when a plurality of entries, each having an attribute value of a first attribute associated with an attribute value of a second attribute, is stored in the recording medium, the CPU 1212 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described program or software modules may be stored in the computer readable storage medium on the computer 1200 or near the computer 1200. In addition, a recording medium such as a hard disk or a RAM provided in a server system connected to a dedicated communication network or the Internet can be used as the computer readable storage medium, thereby providing the programs to the computer 1200 via the network.

The blocks of the flowcharts and the block diagrams according to the present embodiment may represent steps of processes in which operations are executed or units of apparatuses responsible for executing operations. Certain steps and units may be implemented by dedicated circuitry, programmable circuitry supplied with computer readable instructions stored on computer readable storage media, and/or processors supplied with computer readable instructions stored on computer readable storage media. Dedicated circuitry may include digital and/or analog hardware circuits and may include integrated circuits (IC) and/or discrete circuits. Programmable circuitry may include, for example, reconfigurable hardware circuits including logical AND, OR, XOR, NAND, NOR, and other logical operations, flip-flops, registers, and memory elements, such as field-programmable gate arrays (FPGA), programmable logic arrays (PLA), etc.

A computer readable storage medium may include any tangible device that can store instructions for execution by a suitable device, such that the computer readable storage medium having instructions stored therein includes an article of manufacture including instructions which can be performed to create means for performing operations specified in the flowcharts or block diagrams. Examples of a computer readable storage medium may include an electronic storage medium, a magnetic storage medium, an optical storage medium, an electromagnetic storage medium, a semiconductor storage medium, etc. More specific examples of a computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disc read only memory (CD-ROM), a digital versatile disk (DVD), a BLU-RAY (registered trademark) disc, a memory stick, an integrated circuit card, etc.

Computer readable instructions may include any of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry performs the computer readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, specification, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100: processing system, 200: CPU, 210: core, 212: VM, 220: memory, 222: instruction set, 224: processing target data, 232: target data obtaining unit, 234: parallel processing determination unit, 236: VM execution control unit, 238: storage control unit, 240: processing result obtaining unit, 242: processing result generation unit, 300: GPU, 310: SM, 320: memory, 322: instruction set, 324: partial data, 1200: computer, 1210: host controller, 1212: CPU, 1213: GPU, 1214: RAM, 1216: graphics controller, 1218: display device, 1220: input and output controller, 1222: communication interface, 1224: storage device, 1230: ROM, 1240: input and output chip

What is claimed is:

1. A method of causing a central processing unit (CPU) to perform processing outside of the CPU, comprising:
executing a virtual machine (VM) on a core in the CPU;
determining, within the CPU, whether parallel processing on at least some of processing target data is to be performed outside of the CPU;
in response to determining the parallel processing on the at least some of the processing target data is to be performed outside of the CPU, executing a copy of the VM on each core of a plurality of cores in a parallel processing graphics processing unit (GPU), wherein each core of the plurality of cores in the parallel processing GPU are multiprocessors;
based on the parallel processing on each core of the parallel processing GPU:
dividing the at least some of the processing target data into a plurality of partial data that can be separately processed in parallel; and
storing the plurality of partial data in a memory of the parallel processing GPU; and
obtaining, by the CPU from the parallel processing GPU, a plurality of processing results of the plurality of partial data processed by respective VMs of each of the plurality of cores in the parallel processing GPU.

2. The method of causing the CPU to perform processing outside of the CPU according to claim 1, wherein in response to determining the parallel processing on the at least some of the processing target data is to be performed outside of the CPU, the VM of the core of the CPU is executed in the CPU, and each of the plurality of cores of the parallel processing GPU are caused to execute the copy of the VM.

3. The method of causing the CPU to perform processing outside of the CPU according to claim 2, wherein
each copy of the VM has an architecture common to the VM of the core of the CPU.

4. The method of causing the CPU to perform processing outside of the CPU according to claim 3, wherein in response to determining the CPU is to process a first part of the plurality of partial data, and the parallel processing GPU is to be caused to perform parallel processing on a second part of the plurality of partial data, the VM of the core of the CPU is caused to process the first part of the plurality of partial data,
the second part of the plurality of partial data is divided into additionally separated data that can be processed in parallel, and to cause the memory of the parallel processing GPU to store the additionally separated data, and
respective ones of the plurality of processing results of the second part of the plurality of partial data are obtained from the parallel processing GPU.

5. The method of causing the CPU to perform processing outside of the CPU according to claim 3, further comprising:
obtaining a message queueing telemetry transport (MQTT) message, wherein
the determining whether the parallel processing is to be performed on the at least some of the processing target data is obtained from the MQTT message.

6. A processing system comprising:
the CPU according to claim 3; and
the parallel processing GPU.

7. The method of causing the CPU to perform processing outside of the CPU according to claim 2, wherein in response to determining the CPU is to process a first part of the plurality of partial data, and the parallel processing GPU is to be caused to perform parallel processing on a second part of the plurality of partial data, the VM of the core of the CPU is caused to process the first part of the plurality of partial data,
the second part of the plurality of partial data is divided into additionally separated data that can be processed in parallel, and to cause the memory of the parallel processing GPU to store the additionally separated data, and
respective ones of the plurality of processing results of the second part of the plurality of partial data are obtained from the parallel processing GPU.

8. The method of causing the CPU to perform processing outside of the CPU according to claim 7, further comprising:
generating a processing result of the processing target data based on a combination of a processing result of the first part of the plurality of partial data by the VM of the core of the CPU and the respective ones of the plurality of processing results of the second part of the plurality of partial data.

9. The method of causing the CPU to perform processing outside of the CPU according to claim 8, further comprising:
obtaining a message queueing telemetry transport (MQTT) message, wherein the determining whether the parallel processing is to be performed on the at least some of the processing target data is obtained from the MQTT message.

10. The method of causing the CPU to perform processing outside of the CPU according to claim 7, further comprising:

obtaining a message queueing telemetry transport (MQTT) message, wherein the determining whether the parallel processing is to be performed on the at least some of the processing target data is obtained from the MQTT message.

11. A processing system comprising:

the CPU according to claim 7; and the parallel processing GPU.

12. The method of causing the CPU to perform processing outside of the CPU according to claim 2, further comprising:

obtaining a message queueing telemetry transport (MQTT) message, wherein the determining whether the parallel processing is to be performed on the at least some of the processing target data is obtained from the MQTT message.

13. A processing system comprising:

the CPU according to claim 2; and the parallel processing GPU.

14. The method of causing the CPU to perform processing outside of the CPU according to claim 1, further comprising:

obtaining a message queueing telemetry transport (MQTT) message, wherein the determining whether the parallel processing is to be performed on the at least some of the processing target data is obtained from the MQTT message.

15. A processing system comprising:

the CPU according to claim 1; and the parallel processing GPU.

* * * * *